(12) United States Patent
Long

(10) Patent No.: US 8,678,322 B2
(45) Date of Patent: Mar. 25, 2014

(54) MULTIFUNCTIONAL CHAMBERED RADIATION SHIELDS AND SYSTEMS AND RELATED METHODS

(75) Inventor: David S. Long, Erda, UT (US)

(73) Assignee: Alliant Techsystems Inc., Arlington, VA (US)

( * ) Notice: Subject to any disclaimer, the term of this patent is extended or adjusted under 35 U.S.C. 154(b) by 63 days.

(21) Appl. No.: 13/095,659

(22) Filed: Apr. 27, 2011

(65) Prior Publication Data
US 2012/0273622 A1 Nov. 1, 2012

(51) Int. Cl.
*B64G 1/54* (2006.01)
*B64G 1/00* (2006.01)
*G21F 5/06* (2006.01)
*G21F 1/12* (2006.01)

(52) U.S. Cl.
USPC .............. 244/171.7; 244/158.1; 244/172.2

(58) Field of Classification Search
USPC .......... 244/171.7, 172.2; 414/8; 89/36.11; 220/585, 560.9, 560.11, 4.13, 560.1, 220/4.14, 560.07; 52/425
See application file for complete search history.

(56) References Cited

U.S. PATENT DOCUMENTS

| | | | | |
|---|---|---|---|---|
| 2,507,778 | A * | 5/1950 | Frey | 220/585 |
| 3,149,742 | A * | 9/1964 | Hay et al. | 220/560.13 |
| 4,037,751 | A | 7/1977 | Miller et al. | |
| 4,314,682 | A | 2/1982 | Barnett et al. | |
| 4,964,597 | A | 10/1990 | Hijazi | |
| 5,015,863 | A | 5/1991 | Takeshima et al. | |
| 5,094,409 | A * | 3/1992 | King et al. | 244/159.6 |
| 5,236,101 | A * | 8/1993 | Dugmore | 220/265 |
| 5,316,171 | A * | 5/1994 | Danner et al. | 220/592.21 |
| 5,474,262 | A * | 12/1995 | Fiore | 244/159.4 |
| 6,062,316 | A * | 5/2000 | Alhamad | 220/62.17 |
| 6,110,567 | A * | 8/2000 | Bird | 428/178 |
| 6,278,125 | B1 | 8/2001 | Belek | |
| 6,310,355 | B1 | 10/2001 | Cadwalader | |
| 6,481,670 | B1 * | 11/2002 | Bigelow et al. | 244/171.8 |
| 6,973,947 | B2 * | 12/2005 | Penaloza et al. | 141/286 |
| 7,070,151 | B2 | 7/2006 | D'Ausilio et al. | |
| 7,589,429 | B2 * | 9/2009 | Hunter | 290/1 A |
| 7,703,721 | B2 * | 4/2010 | Bigelow | 244/171.7 |
| 8,235,009 | B2 * | 8/2012 | Hunter | 123/3 |
| 2004/0031885 | A1 | 2/2004 | D'Ausilio et al. | |
| 2005/0269231 | A1 * | 12/2005 | White et al. | 206/438 |
| 2006/0060718 | A1 | 3/2006 | Bigelow | |
| 2008/0256960 | A1 * | 10/2008 | Greason et al. | 220/560.07 |
| 2010/0086729 | A1 | 4/2010 | Long | |

OTHER PUBLICATIONS

National Aeronautics and Space Administration, Exploration Systems Mission Directorate Lunar Surface Systems Concepts Study, Broad Agency Announcement, Jun. 6, 2008, pp. 1-13, BAA NNJ08ZBT002, NASA.

National Aeronautics and Space Administration, Exploration Systems Mission Directorate Lunar Surface Systems Concepts Study, Lunar Surface Systems Overview, ESMD Broad Agency Announcement, Jun. 6, 2008, pp. 1-59, NASA.

\* cited by examiner

*Primary Examiner* — Rob Swiatek
*Assistant Examiner* — Marc Burgess
(74) *Attorney, Agent, or Firm* — TraskBritt

(57) ABSTRACT

Radiation shields include an outer composite wall, an inner composite wall, and an enclosed fuel chamber disposed between the inner and outer composite walls. A fuel may be contained within the enclosed fuel chamber. Spacecraft include one or more such radiation shields, and may further include a fuel cell and a conduit providing fluid communication between the fuel chamber of the radiation shield and the fuel cell. Methods of forming a radiation shield system include forming an enclosed fuel chamber between an outer composite wall and an inner composite wall of a radiation shield, and providing fuel within the enclosed fuel chamber.

27 Claims, 6 Drawing Sheets

MULTIFUNCTIONAL CHAMBERED RADIATION SHIELDS AND SYSTEMS AND RELATED METHODS

TECHNICAL FIELD

Embodiments of the invention relate to structures for shielding micrometeorites and radiation, such as, for example, cosmic and solar radiation, to spacecraft including such structures, and to methods of design and forming such structures and spacecraft.

BACKGROUND

During exploration of extraterrestrial space (e.g., outer space, the moon, other planets, etc.), people and/or instruments are carried by spacecraft into space, and may be transferred from a spacecraft to a space module such as, for example, a space station, a lunar station, or a planetary station. As used herein, the term "spacecraft" means and includes a vehicle or device designed for travel or operation outside the earth's atmosphere. Thus, spacecraft include both vehicles designed for propulsion through space, as well as station modules to be transported, located and used in extraterrestrial settings.

On earth, the atmosphere provides at least some degree of protection from harmful radiation (e.g., cosmic rays and solar radiation) and micrometeoroid impacts (i.e., micrometeorites). Radiation and micrometeoroids can be harmful to people, and can damage instruments and equipment used for exploration of extraterrestrial space. In extraterrestrial settings, a protective atmosphere like that found on earth is not present. Thus, people and instruments in extraterrestrial settings need to be shielded from such radiation and micrometeoroid impacts. Radiation shields are used on spacecraft to shield people and/or instruments from harmful radiation and micrometeorites.

Previous designs have made use of metallic material alloys, mostly of aluminum, for spacecraft designs. More recent studies have discussed the use of polyethylene in spacecraft, but polyethylene alone has insufficient structural properties. There has been resistance by customers within the industry to adopt primary composite structures on man-rated spacecraft until problems with radiation shielding, and with structural and fracture mechanics issues, have been adequately addressed.

BRIEF SUMMARY

In some embodiments, the present invention includes radiation shields that comprise an outer composite wall comprising a first layer of composite material and an inner composite wall comprising a second layer of composite material. An enclosed fuel chamber is disposed between the outer composite wall and the inner composite wall. A fuel may be contained within the enclosed fuel chamber.

In additional embodiments, the present invention includes spacecraft that comprise a radiation shield having an enclosed fuel chamber therein, a fuel cell, and at least one conduit providing fluid communication between the enclosed fuel chamber and the fuel cell. The radiation shield may include an outer composite wall comprising a first layer of composite material, and an inner composite wall comprising a second layer of composite material. The enclosed fuel chamber is disposed between the outer composite wall and the inner composite wall. The radiation shield further comprises at least one fuel port located and configured to provide fluid communication between the enclosed fuel chamber and the interior or exterior of the radiation shield through at least one of the outer composite wall and the inner composite wall.

In additional embodiments, the present invention includes methods of forming a radiation shield system in which an enclosed fuel chamber is formed between an outer composite wall and an inner composite wall of a radiation shield, and fuel is provided within the enclosed fuel chamber.

BRIEF DESCRIPTION OF THE SEVERAL VIEWS OF THE DRAWINGS

While the specification concludes with claims particularly pointing out and distinctly claiming what are regarded as embodiments of the invention, advantages of the invention can be more readily ascertained from the following detailed description of some embodiments of the invention, when read in conjunction with the accompanying drawings in which:

DETAILED DESCRIPTION

The illustrations presented herein are not necessarily meant to be actual views of any particular spacecraft, radiation shield, or component thereof, but are merely idealized representations that are employed to describe methodological or conceptual functional embodiments of the present invention.

Embodiments of the invention may utilize mostly low atomic number elements in ordered thickness composite layers to form structural walls for radiation and micrometeorite shielding. The structural walls may include one or more enclosed chambers for fuel and added regolith, and may be employed in spacecraft. To keep the weight of the spacecraft low, fuel and on site surface material may be used as additional shielding material. Such radiation shields for spacecraft may be preferable over high atomic number metal radiation shields, in that there is less primary and much less secondary radiation (neutrons and high energy photons) human dose for a given mass of shielding material, especially for low- to mid-range energy cosmic particles and solar flares. In addition, use of an efficient liquid hydrogen or heavy liquid hydrogen fuel in an enclosing chamber is a relatively effective high human dose neutron absorber.

Figure 1:
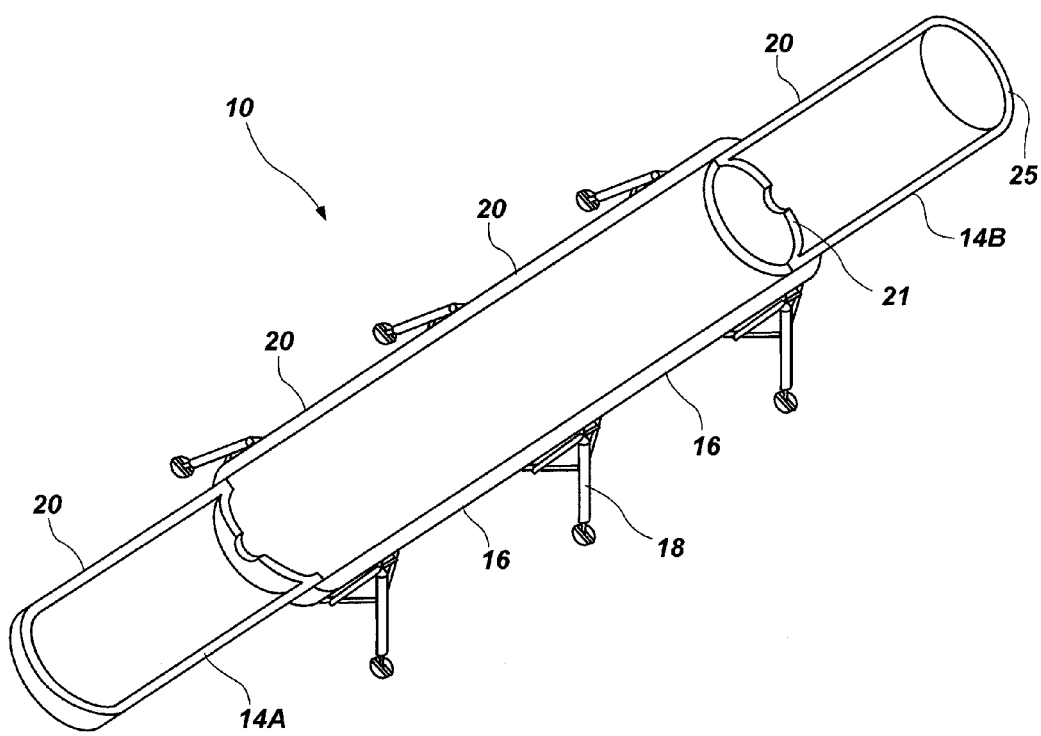
FIG. 1 is a perspective view of an embodiment of a spacecraft that includes an outer wall comprising an embodiment of a radiation shield of the present invention.

FIG. 1 is a perspective view of an embodiment of a spacecraft 10 of the present invention. The spacecraft 10 includes an embodiment of a radiation shield 20 of the present invention, as discussed in further detail below. Although the exact shape of the spacecraft 10 is not critical to aspects of the present invention, the spacecraft 10 shown in FIG. 1 includes two telescoping modules 14A and 14B that are attached to a base module 16 in an end-to-end configuration. The telescoping modules 14A and 14B and the base module 16 are arranged and attached together such that the modules 14A and 14B may telescopically extend in opposing directions from the base module 16. The telescoping modules 14A, 14B may be deployed using, for example, expanding gases from pyrotechnic devices, which may release gas into smaller chambered volumes between the base module 16 and the telescoping modules 14A, 14B, or they may be deployed responsive to interior pressure upon release of corresponding latches. Viscous dampers may be used to dampen movement of the telescoping modules 14A, 14B.

Thus configured, the telescoping modules 14A,14B may be longitudinally retracted or collapsed relative to the base module 16 such that the base module 16 and the telescoping modules 14A, 14B are concentrically arranged one about another. The spacecraft 10 may be fabricated on earth and provided in the retracted configuration and sent to a desirable extraterrestrial location such as, for example, space, the moon, another planet, etc. In the retracted configuration, the volume of space occupied by the spacecraft 10 is only about as large as that of the base module 16. Once deployed into space or situated at a desired destination, the telescoping modules 14A, 14B may be telescopically extended from the base module 16 to the configuration shown in FIG. 1. The telescoping modules 14A, 14B and the base module 16 may be configured to form, in combination, a hermetic enclosure that may be occupied by persons and/or equipment. The hermetic enclosure provided by the spacecraft 10 may be configured to contain people and/or instruments therein in an extraterrestrial setting.

Each of the telescoping modules 14A, 14B and the base module 16 may comprise a wall that is, or that comprises, an embodiment of a radiation shield 20 of the present invention. When a lunar station, the entire structure is supported to the Lander or supported separately on the moon using efficient 3-8 inch diameter straight tube struts 18 (that have been specifically designed and fabrication demonstrated for the Lunar Lander) made with metallic end fittings that are folded for launch or attached on site. The outer chamber wall is connected at the ends and in the main region by staggered web baffles 21. Exterior frames 25 allow for attachment to other sections including inflatable appendages.

Figure 2:
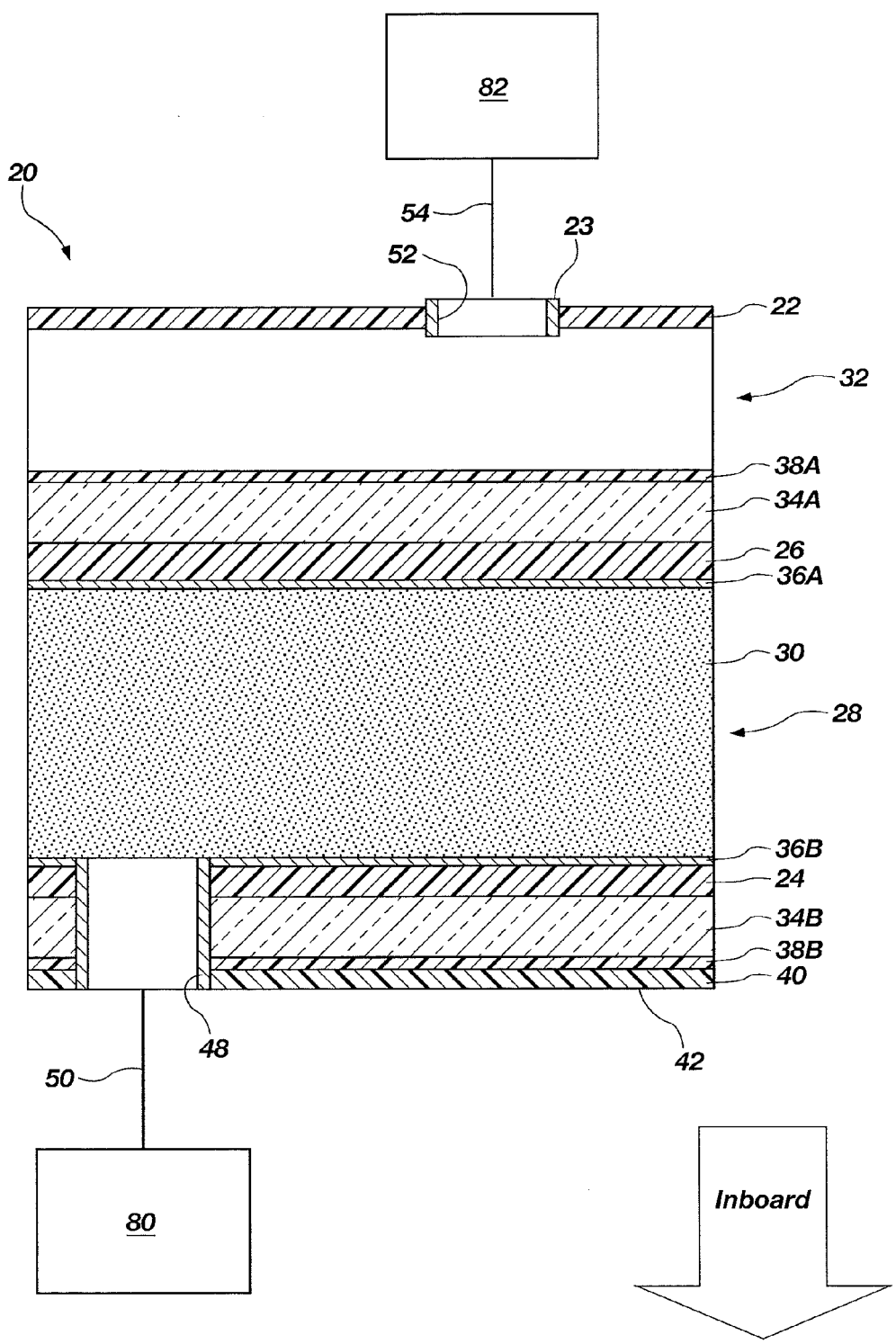
FIG. 2 is a cross-sectional view of the radiation shield of the spacecraft shown in FIG. 1.

FIG. 2 is a cross-sectional view of a radiation shield 20 of the spacecraft 10 shown in FIG. 1. The radiation shield 20 includes an outer composite wall 22, an inner composite wall 24, and an enclosed fuel chamber 28 disposed between the outer composite wall 22 and the inner composite wall 24. The fuel chamber 28 may contain one or more fuels. For example, the fuel chamber 28 may contain an electrochemical fuel such as $LH_2$ (e.g., liquid hydrogen as parahydrogen at −423° F. for 0.0678 gm/cm³), liquefied hydrogen deuteride ($L^1H^2H$), and/or LOX (e.g., liquid oxygen at −368° F. for 1.141 gm/cm3) for a fuel cell 80. Thus, the radiation shield 20 may further include at least one fuel port 48 that is located and configured to provide fluid communication between the enclosed fuel chamber 28 and the exterior of the radiation shield 20 through at least one of the outer composite wall 22 and the inner composite wall 24. As used herein, the term "outboard" means outside a spacecraft, or toward the outside of a spacecraft, and the term "inboard" means inside a spacecraft, or toward the inside of a spacecraft. At least one fuel conduit 50 may provide fluid communication between the fuel port 48 and the fuel cell 80 to allow fuel to be supplied from the enclosed fuel chamber 28, through the fuel port 48 (which may comprise an inboard fuel port) and the at least one fuel conduit 50 to the fuel cell 80 (which may comprise an inboard fuel cell). Thus, the spacecraft 10 comprises a radiation shield system that includes the radiation shield 20 having the enclosed fuel chamber 28 therein, the fuel cell 80, and the fuel conduit 50. The fuel cell 80 and the conduit 50 may be exterior or interior to the spacecraft 10.

The radiation shield 20 may also comprise at least one interior composite wall 26 that is disposed between the outer composite wall 22 and the inner composite wall 24. An additional enclosed chamber 32 may be disposed between the outer composite wall 22 and the inner composite wall 24 on an opposite side of the at least one interior composite wall 26 from the enclosed fuel chamber 28. The additional enclosed chamber 32 may comprise, for example, a vacuum chamber, or the additional enclosed chamber 32 may be filled with a gas (e.g., air, oxygen, hydrogen, nitrogen, a noble gas, etc.).

In some embodiments, the spacecraft 10 may be configured to be located on the moon or another planet such as Mars. In such embodiments, the additional enclosed chamber 32 may be configured to receive regolith (i.e., unconsolidated, lunar or planetary particulate material, such as dust, that overlies solid rock on the moon or another planet) therein once the spacecraft 10 has been located on the moon or another planet. It may be desirable, upon landing the spacecraft 10 on the moon or another planet, to remove regolith (i.e., dust, soil, etc.) away from the base of the spacecraft 10. This regolith could be collected and deposited in additional enclosed chamber 32 to provide additional shielding from micrometeorites and radiation using material that does not need to be transported by the spacecraft 10. The average thickness of the chamber 32 may be, for example, between about 2.5 centimeters and about 60.0 centimeters. For example, if the spacecraft 10 is intended to be located on Mars, the average thickness of the chamber 32 may be about fifteen centimeters. If the spacecraft 10 is intended to be located on the moon, the average thickness of the chamber 32 may be about fifty centimeters. Thus, the radiation shield 20 may further include at least one port 52 that is located and configured to provide fluid communication between the additional enclosed chamber 32 and the exterior of the radiation shield 20 through at least one of the outer composite wall 22 and the inboard composite wall 26. At least one conduit 54 may provide fluid communication between the port 52 and a pump or fan device 82 to allow regolith to be moved into the additional enclosed chamber 32 by the pump or fan device 82 through the conduit 54 and the port 52.

The outer composite wall 22, the inner composite wall 24, and the interior composite wall 26 may be jointly connected by webs therebetween, and/or may be bonded together along at least a portion of a peripheral boundary or at the ends of the enclosed fuel chamber 28 and/or the additional enclosed chamber 32 to form a hermetic pressure seal and enclose the fuel chamber 28 and or the chamber 32.

The fuel chamber 28 optionally may include a porous body 30 (e.g., a foam or sponge-like structure) therein having an open (interconnected) pore network structure therein. In some embodiments, the porosity of the porous body 30 may comprise between about 25% and about 65% of the total volume of the porous body 30. The porous body 30 may or may not be bonded to the adjacent composite walls, and may have structural shear-webs and frames within.

The porous body 30 may be relatively rigid, and may comprise, for example, open cell sponge of carbon material, an open cell sponge ceramic metal composite (CMC) material, an open cell sponge of activated nano-carbon material, an open cell sponge of nickel or nickel alloy, an open cell sponge of palladium (or palladium alloy) (which may have vapor deposited platinum thereon). In additional embodiments, the porous body 30 may comprise sintered ceramic foam or pyrolized resin polymer. The porous body 30 may be configured to hold a fuel such as hydrogen, and may be configured such that $H_2$ or $PdH_2$ will be physically adsorbed on and/or in the porous body 30. Fuel may be contained within the pores of the open pore network structure of the porous body 30 within the fuel chamber 28. In some embodiments, the fuel chamber 28 may include a plurality of isolated segments, which may include different types of fuel. For example, one segment may comprise hydrogen, and another segment may comprise oxygen (e.g., liquefied oxygen). In additional embodiments, the porous body 30 may be cast in the form of a hexagonal perforated honeycomb structure.

The radiation shield 20 optionally may include any of a number of additional layers. For example, the radiation shield 20 may include one or both of a first insulating layer 34A disposed on an outboard side of the enclosed fuel chamber 28, and a second insulating layer 34B disposed on an inboard side of the enclosed fuel chamber 28, as shown in FIG. 2. As used herein, the term "outboard" means outside a spacecraft, or toward the outside of a spacecraft, and the term "inboard" means inside a spacecraft, or toward the inside of a spacecraft. The thermally insulating layers 34A, 34B may be used to thermally insulate the enclosed fuel chamber 28.

The radiation shield 20 may further include one or both of a first liner 36A disposed on an outboard side of the enclosed fuel chamber 28, and a second liner 36B disposed on an inboard side of the enclosed fuel chamber 28, as shown in FIG. 2. The metal liners 36A, 36B may be used to bond the porous body 30 of the enclosed fuel chamber 28 to each of the interior composite wall 26 and the inner composite wall 24, respectively.

The radiation shield 20 may further include one or both of a first fiber-reinforced composite fail safe layer 38A disposed on an outboard side of the enclosed fuel chamber 28, and a second fiber-reinforced composite fail safe layer 38B disposed on an inboard side of the enclosed fuel chamber 28, as shown in FIG. 2. The fail safe layers 38A, 38B may be used to protect the insulating layers 34A, 34B and the enclosed fuel chamber 28 therebetween. The fail safe layers 38A, 38B may be relatively more resistant to transverse loading compared to the composite walls 22, 24, 26.

A polymer radiation shield layer 40 may be provided on an inboard side of the second fiber-reinforced composite fail safe layer 38B, as shown in FIG. 2. The polymer radiation shield layer 40 may comprise an innermost layer of the radiation shield 20, such that an inner surface 42 of the radiation shield 20 comprises an exposed inboard major surface of the polymer radiation shield layer 40. The purpose of this layer, which is likely borated polyethylene $(-(CH_2-CH_2)n-)$ is to absorb low energy cascade electrons and neutrons from the last inboard foil layer. It is likely not a primary load carrying layer.

Figure 3:
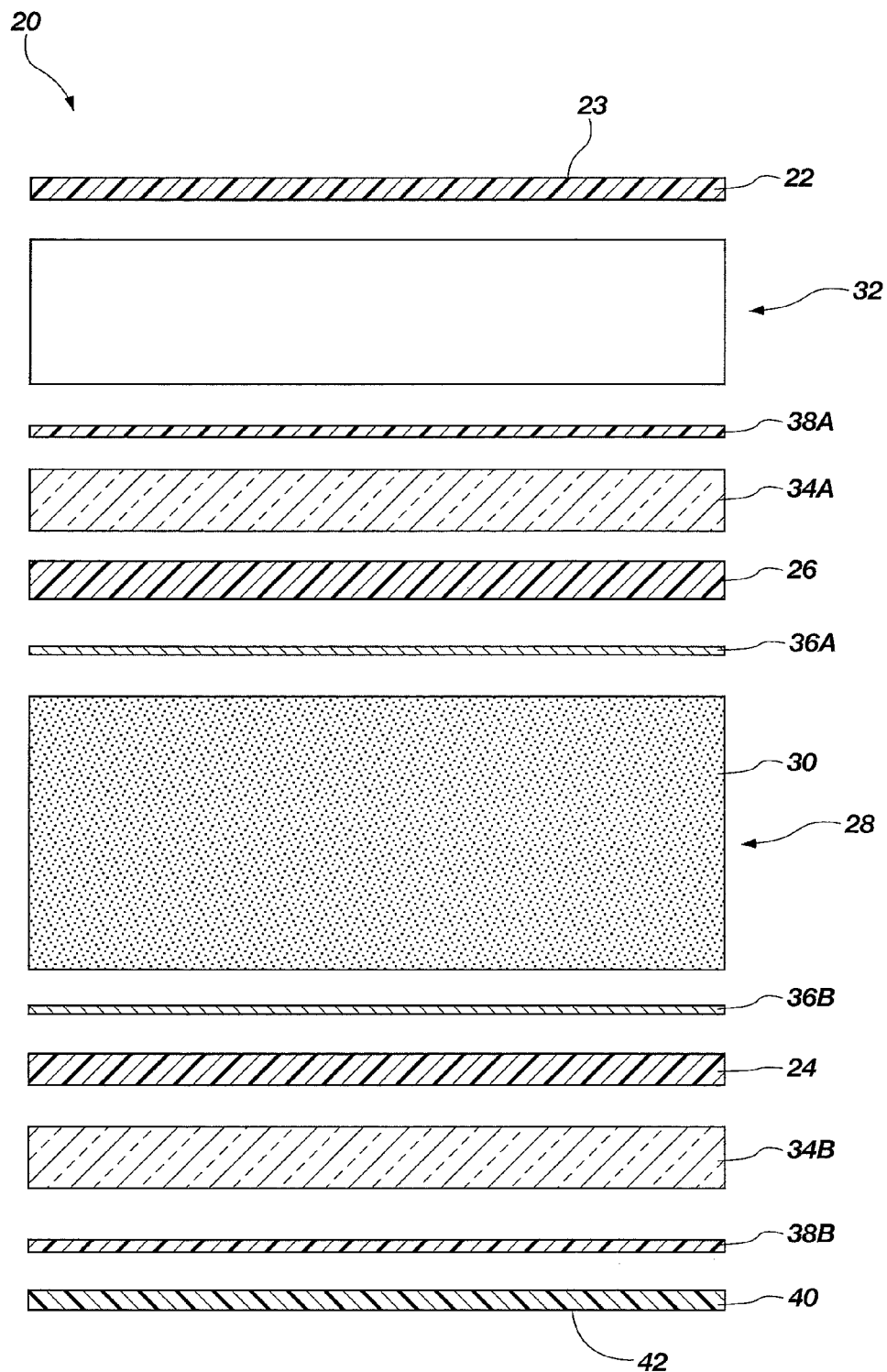
FIG. 3 is an exploded view of FIG. 2 illustrating the various layers of the radiation shield shown therein.

The various components of the radiation shield 20 are described in further detail below with reference to FIG. 3, which is an exploded view of the various layers of the radiation shield 20 of FIGS. 1 and 2.

The outer composite wall 22 may comprise a composite material that includes a reinforcing phase disposed within a matrix phase. For example, the reinforcing phase may comprise particles, whiskers, fibers, etc. In some embodiments, the reinforcing phase may comprise a woven fabric of reinforcing fibers. In some embodiments, the outer composite wall 22 may comprise a relatively rigid carbon fiber composite material including a carbon fiber reinforcing phase (e.g., a machine wound carbon fiber structure or a hand wrapped woven carbon fiber fabric) within a polymer resin (e.g., cyanate ester) matrix phase. The outer composite wall 22 may be multifunctional in the sense that it may provide structural support to the radiation shield 20, but may also be used for shielding people and/or equipment within the spacecraft 10 from radiation and particles. In some embodiments, the outer composite wall 22 may itself comprise a multi-layer structure.

The outer composite wall 22 may be painted or otherwise coated with a thermal control coating derived from electrically conductive coatings based on $Al_2O_3$, ZnO, $SiO_2$, $Na_2O$, $K_2O$, or a B/C nano-particle polymer version.

Figure 4:
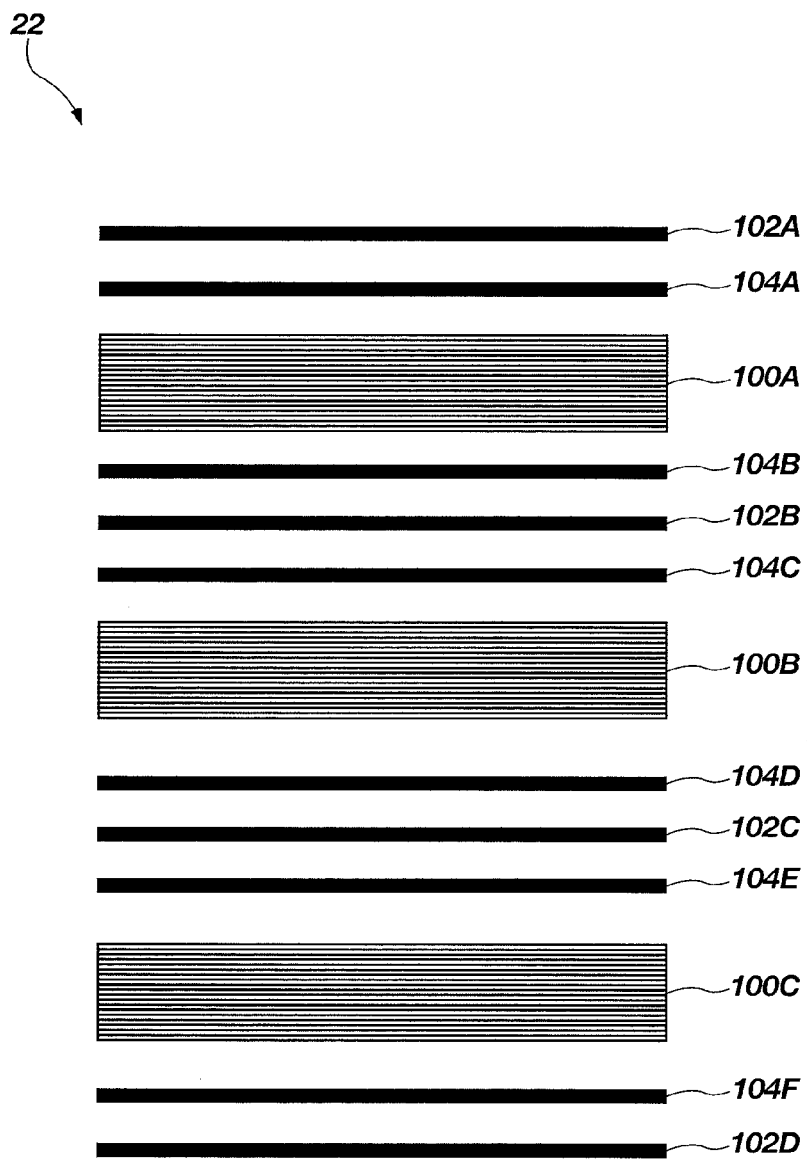
FIG. 4 is an exploded view of a composite wall of the radiation shield shown in FIGS. 1 through 3.

For example, FIG. 4 illustrates an example embodiment of the outer composite wall 22 comprising a multi-layer laminate structure. The outer composite wall 22 shown in FIG. 4 includes a first composite layer 100A, a second composite layer 100B, and a third composite layer 100C. Each of the composite layers 100A-100C may comprise a composite material that includes a reinforcing phase disposed within a matrix phase. For example, the reinforcing phase may comprise particles, whiskers, fibers, etc. In some embodiments, the reinforcing phase may comprise a woven fabric of reinforcing fibers. The matrix phase may comprise a resin such as a cyanate ester resin, a cyanate siloxane resin, or an epoxy $(C_{18}H_{19}O_3)$ resin. In some embodiments, each of the composite layers 100A-100C may comprise a relatively rigid carbon fiber composite material including a carbon fiber reinforcing phase (e.g., a wound tow carbon fiber structure, a carbon uni-tape, or a woven carbon fiber fabric) within a cyanate ester matrix phase. In some embodiments, the composite layers 100A-100C may comprise about 60% reinforcing fiber phase (e.g., carbon fiber) by volume, and about 40% matrix phase (e.g., cyanate ester resin) by volume. The thickness and number of the composite layers will vary depending upon the desired characteristics to be exhibited by the outer composite wall 22 as determined by final design radiation transport and structural analysis with location environment requirements. For example, each of the composite layers 100A-100C may have an average thickness of between about 0.1 millimeters (0.100 inches) and about 5.0 millimeters (0.200 inches) (e.g., about 1.5 millimeters or 0.059 inches). Furthermore, each of the composite layers 100A-100C may have at least substantially identical average thicknesses, or they may have different average thicknesses. In one non-limiting embodiment, the first composite layer 100A and the third composite layer 100C each may have an average thickness of about 1.64 millimeters (0.065 inches), and the second composite layer 100B may have an average thickness of about 1.49 millimeters (0.059 inches). This single layer alone has been analyzed and verified by coupon test to provide energy shielding block of better than 31 MeV protons, and may be superior to aluminum on an areal weight basis. The additional chamber layers combine to provide an even higher total proton transmission energy point. The performance may be due to interactive relational order of atomic numbers and material types greater than the mass sum of the parts.

The outer composite wall 22 shown in FIG. 4 also includes a first metal layer 102A disposed on an outboard side of the first composite layer 100A, a second metal layer 102B disposed between the first composite layer 100A and the second composite layer 100B, a third metal layer 102C disposed between the second composite layer 100B and the third composite layer 100C, and a fourth metal layer 102D disposed on an inboard side of the third composite layer 100C. The metal layers 102A-102D may comprise commercially pure metals such as INVAR® 36, tantalum, aluminum, titanium, tungsten, and beryllium, or alloys based on one or more of such metals. For example, in some embodiments, one or more of the metal layers 102A-102D may comprise INVAR® 36, which is an iron-based alloy having about sixty-four atomic percent (64 at %) iron and about thirty-six atomic percent (36 at %) nickel. INVAR® 36 may also have trace amounts (less than one atomic percent) of one or more of carbon, silicon, cobalt, manganese, nickel, and selenium. For example, the first metal layer 102A and the fourth metal layer 102D may comprise a layer of the above-mentioned metal-based alloy, and the second metal layer 102B and the third metal layer 102C may comprise a layer of another above-mentioned metal-based alloy. The metal layers 102A-102D may provide block protection against various types of primary radiation. The thickness and number of the metal layers 102A-102D will vary depending upon the desired stiffness and shielding characteristics to be exhibited by the outer composite wall 22 as determined by radiation transport and stiffness analysis. For example, each of the metal layers 102A-102D may have an average thickness of between about 0.01 millimeters (0.0004 inches) and about 0.25 millimeters (0.100 inches) (e.g., about 0.10 millimeters or 0.004 inches).

The metal layers 102A-102D may be bonded to the composite layers 100A-100C using relatively thin layers of an adhesive. For example, the adhesive may comprise a resin such as a cyanate ester resin, a cyanate siloxane resin, or an epoxy ($C_{18}H_{19}O_3$) resin. Furthermore, the adhesive may be identical to, similar to, or different from the matrix phase of the composite layers 100A-100C. For example, a first adhesive layer 104A may be used to bond the first metal layer 102A to the outboard side of the first composite layer 100A, a second adhesive layer 104B may be used to bond the second metal layer 102B to the inboard side of the first composite layer 100A, a third adhesive layer 104C may be used to bond the second metal layer 102B to the outboard side of the second composite layer 100B, a fourth adhesive layer 104D may be used to bond the third metal layer 102C to the inboard side of the second composite layer 100B, a fifth adhesive layer 104E may be used to bond the third metal layer 102C to the outboard side of the third composite layer 100C, and a sixth adhesive layer 104F may be used to bond the fourth metal layer 102D to the inboard side of the third composite layer 100C. The adhesive layers 104A-104F may have an average thickness of between about 0.02 millimeters (0.0008 inches) and about 0.50 millimeters (0.020 inches) (e.g., about 0.127 millimeters or 0.005 inches).

In some embodiments, the outer composite wall 22 shown in FIG. 4 may have a thermal control polymer coating on the outboard surface of the first metal layer 102A when on the exterior. Similarly, in some embodiments, a thermal control polymer coating may be provided on the inboard surface of the fourth metal layer 102D when on the interior. Such a thermal control polymer coating may comprise bonded borated polyethylene (—($CH_2$—$CH_2$)n-). The outer composite wall 22 may be painted with a variant mix of thermal control coating derived from electrically conductive coatings based on $Al_2O_3$, $ZnO$, $SiO_2$, $Na_2O$, $K_2O$, or a B/C nanoparticle polymer version.

Figure 5:
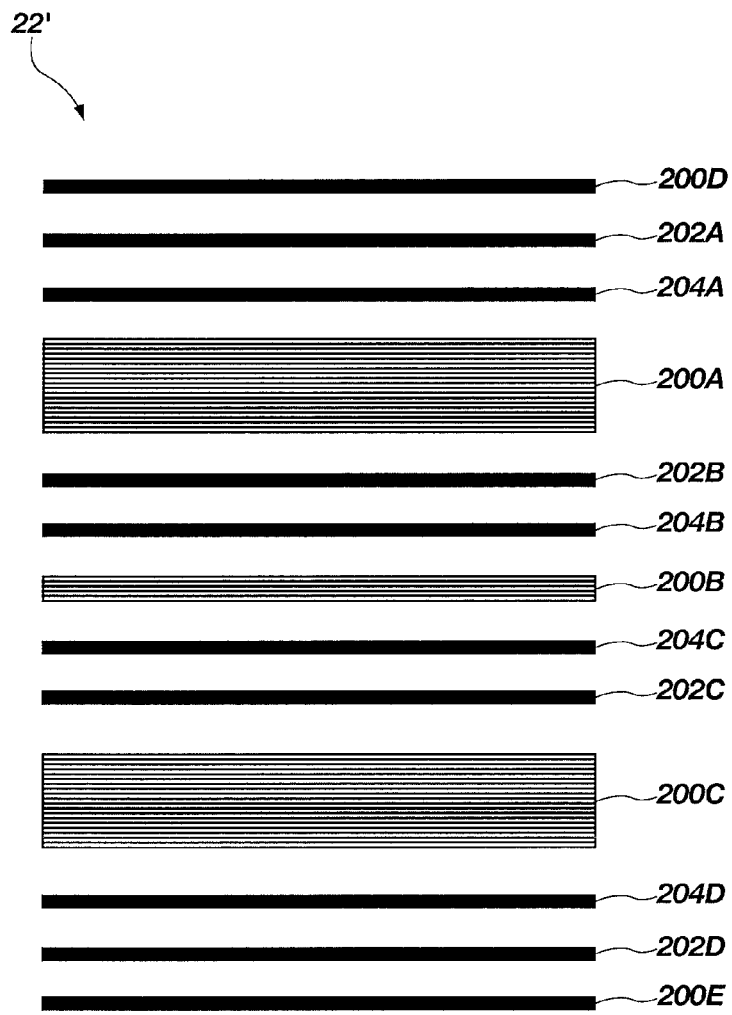
FIG. 5 is an exploded view of another composite wall that may be used in the radiation shield shown in FIGS. 1 through 3.

FIG. 5 illustrates another example embodiment of an outer composite wall 22' comprising a multi-layer laminate structure. The outer composite wall 22' shown in FIG. 5 includes a first composite layer 200A, a second composite layer 200B, and a third composite layer 200C. Each of the composite layers 200A-200C may comprise a composite material that includes a reinforcing phase disposed within a matrix phase. The composite layers 200A-200C may have a configuration and composition as previously described in relation to the composite layers 100A-100C of FIG. 4. Each of the composite layers 200A-200C may have at least substantially identical average thicknesses, or they may have different average thicknesses. In one non-limiting embodiment, the first composite layer 200A and the third composite layer 200C each may have an average thickness of about 2.32 millimeters (0.090 inches), and the second composite layer 200B may have an average thickness of about 0.20 millimeters (0.008 inches).

The outer composite wall 22' shown in FIG. 5 also includes a first metal layer 202A disposed on an outboard side of the first composite layer 200A, a second metal layer 202B disposed between the first composite layer 200A and the second composite layer 200B, a third metal layer 202C disposed between the second composite layer 200B and the third composite layer 200C, and a fourth metal layer 202D disposed on an inboard side of the third composite layer 200C. The metal layers 202A-202D may have a configuration and composition as previously described in relation to the metal layers 102A-102D of FIG. 4. For example, in one non-limiting example embodiment, each of the metal layers 202A-202D may be at least substantially comprised of commercially pure aluminum or an aluminum-based alloy, or another aerospace metal alloy, and may have an average thickness of about 0.05-0.10 millimeters (0.002-0.004 inches).

The outer composite wall 22' shown in FIG. 5 also includes a plurality of polymer layers 204A-204D. In particular, the outer composite wall 22' includes a first polymer layer 204A disposed between the first metal layer 202A and an outboard side of the first composite layer 200A, a second polymer layer 204B disposed between an outboard side of the second composite layer 200B and the second metal layer 202B, a third polymer layer 204C disposed between an inboard side of the second composite layer 200B and the third metal layer 202C, and a fourth polymer layer 204D disposed between an inboard side of the third composite layer 200C and the fourth metal layer 202D. The polymer layers 204A-204D may be used for one or both of shielding effects and bonding effects. For example, in one non-limiting example embodiment, each of the polymer layers 204A-204D may be at least substantially comprised of cyanate ester or cyanate siloxane resin, and may have an average thickness of about 0.02-0.50 millimeters (0.002-0.020 inches).

Optionally, the outer composite wall 22' shown in FIG. 5 may further include a fourth composite layer 200D on an outboard side of the outer composite wall 22', and a fifth composite layer 200E on an inboard side of the outer composite wall 22', as shown in FIG. 5. The composite layers 200D and 200E may have a configuration and composition as previously described in relation to the composite layers 200A-200C, but may have a relatively smaller average thickness compared to the average thicknesses of the composite layers 200A-200C. For example, each of the composite layers 200D and 200E may have an average thickness of about 0.10 to 1.0 millimeters (0.004-0.040 inches).

In additional embodiments, the outer composite wall 22 may comprise a multi-layer laminate structure as disclosed in U.S. patent application Ser. No. 12/247,090, filed Oct. 7, 2008, now U.S. Pat. No. 8,460,777, entitled "Multifunctional Radiation-Hardened Laminate," which is incorporated herein in its entirety by this reference.

Referring again to FIG. 3, in some embodiments, a relatively thin layer of a polymer layer may be provided on an exposed major surface 23 (see also FIG. 2) (i.e., the exposed outboard surface) of the outer composite wall 22. The polymer layer may have an average thickness of between about 0.025 millimeters and about 0.250 millimeters (e.g., about 0.102 millimeters). Such a polymer layer may comprise a polymer material having relatively low solar absorptivity and relatively high emissivity such as, for example, a polyimide ($C_{22}H_{10}O_5N_2$). The polymer material may further include nanoparticles such as single-walled carbon nanotubes at, for example, about 0.1%-3% by volume. The nanoparticles may be used to improve the emissivity and/or absorptivity of the polymer layer. The polymer material may include other filler materials such as, for example, boron particles, boron compounds (e.g., boron nitride in nanotube form), or other boron-containing materials. The purpose of this polymer layer, when on the exterior of the exposed major surface 23, is to control thermal solar emissivity and absorptivity and reduce beta radiation back-scatter. The polymer layer may be painted on the exposed major surface 23 with a variant mix of thermal control coating derived from electrically conductive coatings based on $Al_2O_3$, $ZnO$, $SiO_2$, $Na_2O$, $K_2O$, or a B/C nanoparticle polymer version.

The inner composite wall 24 may have a configuration and a composition as previously described in relation to the outer composite wall 22. In some embodiments, the inner composite wall 24 may be at least substantially similar (e.g., identical) in configuration and composition to the outer composite wall 22. In other embodiments, the inner composite wall 24 may differ from the outer composite wall 22 in one or both of configuration and composition.

The interior composite wall 26, like the inner composite wall 24, may have a configuration and a composition as previously described in relation to the outer composite wall 22. In some embodiments, the interior composite wall 26 may be at least substantially similar to one or both of the outer composite wall 22 and the inner composite wall 24. In other embodiments, the interior composite wall 26 may differ in one or more aspects (e.g., configuration or composition) from one or both of the outer composite wall 22 and the inner composite wall 24.

In some embodiments, each of the outer composite wall 22, the interior composite wall 26, and the fail-safe layers 38A, 38B may comprise a multi-layer laminate structure that includes a mat of carbon nano-yarn, which may serve as a shield layer that is relatively resistant to impact from micrometeorites. Such mats of carbon nano-yarn are commercially available, and may comprise randomly oriented fibers. Such mats may have an average thickness of from about 0.125 mm to about 5.0 mm (about 0.005 inch to about 0.200 inch), and may be impregnated with resin that is relatively impact fracture resistant. In some embodiments, the resin may be relatively effective at damping mechanical vibrations. Such a mat of randomly oriented nano-yarn may be combined with transverse fracture resistant cylindrical 3D orthogonal weave carbon fiber also infused with resin.

Each of the outer composite wall 22, the inner composite wall 24, and the interior composite wall 26 may have an average thickness of between about 0.20 centimeters and about 5.00 centimeters. In some embodiments, the outer composite wall 22, the inner composite wall 24, and the interior composite wall 26 may have at least substantially equal thicknesses. In other embodiments, the outer composite wall 22, the inner composite wall 24, and the interior composite wall 26 may have differing average thicknesses.

As previously mentioned, the enclosed fuel chamber 28 may be used to store fuel therein. For example, a fuel for a fuel cell such as liquid hydrogen or liquefied hydrogen deuteride ($L^1H^2H$) may be stored in the enclosed fuel chamber 28. In some embodiments, the enclosed fuel chamber 28 may simply comprise an open volume of space that may be at least substantially occupied by a fuel. In other embodiments, the enclosed fuel chamber 28 may include a porous body 30 (e.g., a foam or sponge-type structure) therein having an open pore network structure therein, as previously mentioned. The porous body 30 may be relatively rigid, and may comprise, for example, a ceramic material. Fuel may be contained within the pores of the open pore network structure of the porous body 30 within the enclosed fuel chamber 28. As non-limiting examples, the porous body 30 may comprise carbon foam, a nickel sponge, or ceramic matrix composite (CMC) foam. The porous body 30 may also include a material used to stabilize fuel contained within the enclosed fuel chamber 28. For example, if the fuel chamber 28 is to contain liquid hydrogen, nickel compounds and/or activated carbon may be provided within the fuel chamber 28 (e.g., within the porous body 30). Such materials may help to stabilize and maintain the liquid parahydrogen isomer.

The enclosed fuel chamber 28 may have an average thickness of between about 2.5 centimeters and about 50.0 centimeters.

Liquid hydrogen and liquefied hydrogen deuteride ($L^1H^2H$) are relatively effective for shielding neutron particles and galactic cosmic radiation in general. Thus, by storing liquid or gaseous hydrogen fuel in the radiation shield 20 until it is used, the hydrogen may be used as a shielding material for improving the shielding performance of the radiation shield 20 to levels that allow safe occupation of the spacecraft 10 by personnel.

In embodiments in which liquid hydrogen ($LH_2$) or liquefied hydrogen deuteride ($L^1H^2H$) is stored within the enclosed fuel chamber 28, the liquid hydrogen may be stored on average at a pressure of from about 0.34 megapascals (about 50 pounds per square inch) to about 1.03 megapascals (about 150 pounds per square inch) (e.g., 70 pounds per square inch), and a temperature of about −253 degrees Celsius (−423° F.). Thus, it may be desirable to employ the first insulating layer 34A and the second insulating layer 34B, between which the enclosed fuel chamber 28 may be disposed, and a vacuum in the additional enclosed chamber 32 at launch. The porous body 30 may possibly continue to hold some fuel in the event of a small micrometeorite puncture pressure loss until damage is repaired. In embodiments in which the fuel comprises hydrogen, the hydrogen fuel could be consumed at the boil off rate, which may be between about 0.3% and about 0.6% per day. Solar energy could be used to reconvert water back to hydrogen and oxygen, and the enclosed fuel chamber 28 could be recharged by a small separate higher pressure tank system. Hydrogen deuteride (i.e., heavy hydrogen) is stable with one proton and one neutron and is not radioactive and has little interaction with photons, but does interact with neutrons.

In some embodiments, to reduce boil-off of fuel within the enclosed fuel chamber 28, the pressure within the enclosed fuel chamber 28 may be maintained at a pressure greater than about 3,000 psi (e.g., around 3,600 psi). In such embodiments, the average thickness (and, hence, strength) of the inner composite wall 24 and the interior composite wall 26 may be increased.

In some embodiments, the porous body 30 in one or more sections of the fuel chamber 28 may comprise open cell sponge metal, hydride alloy of palladium, or sponge nickel with vapor/ion deposited platinum, in which non-liquefied hydrogen may be stored at an average temperature that is relatively closer to room temperature. Hydrogen stored in such a porous body 30 may be stored in a volume that may be as low as 1/500th or less, or even 1/900th or less, of a volume typically occupied by hydrogen gas at room temperature, and may be stored at a pressure between about 10 psi to about 350 psi depending on the exact alloy composition of the porous body 30. The porous body 30 may also contain carbon nanotubes.

Each of the first insulating layer 34A and the second insulating layer 34B may comprise a thermally insulating material such as, for example, a ceramic material having a thermal conductivity of about 50.0 W/mK or less, or even about 2.0 W/mK or less. In some embodiments, the first and second insulating layers 34A, 34B may comprise a composite material including a thermally insulating ceramic filler material in a polymer matrix. For example, oxide (e.g., oxides of Al, Si, and some other metals) or aluminosilicate ceramic (e.g., closed cell $Al_2O_3SiO_2$) particles (e.g., spheres) may be used as a filler material in a pyrolized polymer resin matrix material. Such a pyrolized polymer resin matrix material may have a density of between about 1 g/cc and about 10 g/cc, and may have an elastic modulus of between about 1.0 million pounds per square inch and about 4.0 million pounds per square inch. Such particles may have a multi-modal or a graded particle size distribution, which may allow the volume percentage of the filler particles in the first and second insulating layers 34A, 34B to be increased.

In additional embodiments, the first and second insulating layers 34A, 34B may comprise a fired carbon-matrix-carbon material. In such embodiments, the first and second insulating layers 34A, 34B also may comprise boron material in any polymorph (e.g., boron nitride nanotubes). Boron may provide additional radiation attenuation. The boron filler may be compounded with one or more of C, H, N, Ti, W (e.g., boron nitride (BN), diborane ($B_2O_3$), boron carbide ($B_4C$), decaborance ($B_{10}H_{14}$), carboranes ($C_2B_{10}H_{12}$), titanium diboride ($TiB_2$)). Additional filler materials that may be included in the carbon-matrix-carbon material include silicon carbide (SiC), aluminosilicates ($Al_2SiO_5$), the oxides of silicon (e.g., $SiO_2$) and aluminum (e.g., $Al_2O_3$), as well as carbides and oxides of tungsten (e.g., WC, $WC_2$, $WO_3$). The filler material in the carbon-matrix-carbon material may comprise between about 0.3% and about 26.0% (e.g., about 3.0%) of the volume of the carbon-matrix-carbon material. The filler material may be macro spheres mixed with other micro to nano sized compounds In some embodiments, the first and second insulating layers 34A, 34B may be formed by incorporating any desirable filler material into an epoxy resin, a solvenated sol-gel solution, or a phenolic resin, which then may be infused to a cylindrical structure comprising a weave, fabric, tow, or mat based structure of SiC or C. The resulting structure may be formed and pressed in an autoclave at a low temperature of from about 100° C. to about 150° C., and then pyrolized at a high temperature of from about 700° C. to about 1,050° C. (e.g., 982° C.) in an inert gas environment. This process may result in a pseudo-polycrystalline composite solid with 15%-50% (e.g., 25%-32% by volume) porosity, $Al_2O_3$ at 40%-92%, $SiO_2$ 6%-21%, and potentially additional oxides and other compounds.

In additional embodiments, the porous body 30 in the enclosed fuel chamber 28 may comprise a fired carbon-matrix-carbon material. In such embodiments, the first and second insulating layers 34A, 34B also may comprise boron material in any polymorph (e.g., boron nitride nanotubes). Boron may provide additional radiation attenuation. The boron filler may be compounded with one or more of C, H, N, Ti, W (e.g., boron nitride (BN), diborane ($B_2O_3$), boron carbide ($B_4C$), decaborance ($B_{10}H_{14}$), carboranes ($C_2B_{10}H_{12}$), titanium diboride ($TiB_2$)). Additional filler materials that may be included in the carbon-matrix-carbon material include silicon carbide (SiC), aluminosilicates ($Al_2SiO_5$), the oxides of silicon (e.g., $SiO_2$) and aluminum (e.g., $Al_2O_3$), as well as carbides and oxides of tungsten (e.g., WC, $WC_2$, $WO_3$). The filler material in the carbon-matrix-carbon material may comprise between about 0.3% and about 26.0% (e.g., about 3.0%) of the volume of the carbon-matrix-carbon material. Such a porous body 30 may be formed as described as discussed above in relation to the first and second insulating layers 34A, 34B.

Each of the first and second insulating layers 34A, 34B may have an average thickness of between about 0.6 centimeters and about 12.0 centimeters (e.g., about 2.2 cm).

The additional enclosed chamber 32 may have an average thickness of between about 2.540 centimeters and about 50.0 centimeters.

The first and second liners 36A, 36B may comprise a commercially available polyimide ($C_{22}H_{10}O_5N_2$) or liquid crystal polymer thermoplastic that is suitable for use under cryogenic conditions. In additional embodiments, the first and second liners 36A, 36B may comprise a metal such as aluminum, iron, titanium, tungsten, and molybdenum, or an alloy based on one or more of such metals (e.g., stainless steel). For example, in some embodiments, the first and second metal liners 36A, 36B may comprise INVAR® 36. Each of the first and second metal liners 36A, 36B may have an average thickness of between about 0.002 millimeters (0.00008 inches) and about 1.0 millimeters (0.040 inches) (e.g., about 0.25 millimeters or 0.010 inches).

The first and second fiber-reinforced composite fail safe layers 38A, 38B may have a composition as previously described in relation to the outer composite wall 22. For example, each of the first and second fiber-reinforced composite fail safe layers 38A, 38B may comprise a composite material that includes a reinforcing phase disposed within a matrix phase. For example, the reinforcing phase may comprise particles, whiskers, fibers, etc., and the matrix phase may comprise a polymer resin. As previously mentioned, the fail safe layers 38A, 38B may be used to protect the insulating layers 34A, 34B and the enclosed fuel chamber 28 therebetween, and may be configured to be relatively more resistant to transverse loading compared to the composite walls 22, 24, 26. As a non-limiting example, each of the first and second fiber-reinforced composite fail safe layers 38A, 38B may comprise an orthogonal three-dimensional weave of carbon fiber and/or carbon nano-yam mat in a cyanate ester matrix material. Each of the fail safe layers 38A, 38B may have an average thickness of between about 1.0 millimeters (0.040 inches) and about 5.0 millimeters (0.200 inches). The first and second fiber-reinforced composite fail safe layers 38A, 38B may differ from the other composite walls 22, 24, 26 in that they have fiber reinforcement in orthogonal axes and/or special carbon nano-yarn mat dampening characteristics, which may provide fracture and tear resistance in the event of micrometeorite impact. Such configurations may provide relatively more transverse protection relative to traditional tow wrapped cylinders. Carbon nano-yarn mats may exhibit relatively high damping, and may exhibit negative damping in some instances. In addition to the first and second fiber-reinforced composite fail safe layers 38A, 38B, or as an alternative to the first and second fiber-reinforced composite fail safe layers 38A, 38B, interior stringers and frames could be added to the structure to further enhance resistance to damage. In addition, the first and second insulating layers 34A, 34B may also serve as low modulus projectile shock absorbing layers.

The polymer radiation shield layer 40 on the inboard side of the second fiber-reinforced composite fail safe layer 38B may comprise, for example, a borated polyethylene material in solid or fiber form. For example, boron or compounds of boron may be incorporated into an ultra high-density polyethylene material (UHDPE) ($-(CH_2-CH_2)n-$) material in the form of a solid sheet or pre-impregnated (prepreg) tow, fabric, and/or tape. The boron content in the polyethylene material may comprise, for example, between about two percent (2%) and about twenty five percent (25%) (e.g., about five percent (5%)) by weight. The boron may be effective in absorbing the lower energy neutrons left from the upstream hydrogen fuel elastic scattering last inboard foil layer cascade electrons. Such materials may be designed and configured for neutron shielding. Polymers other than polyethylene such as polyimide ($C_{22}H_{10}O_5N_2$) also may be used.

The polymer radiation shield layer 40 may have an average thickness of between about 0.25 millimeters (0.040 inches) and about 50.0 millimeters (2.0 inches).

Figure 6:
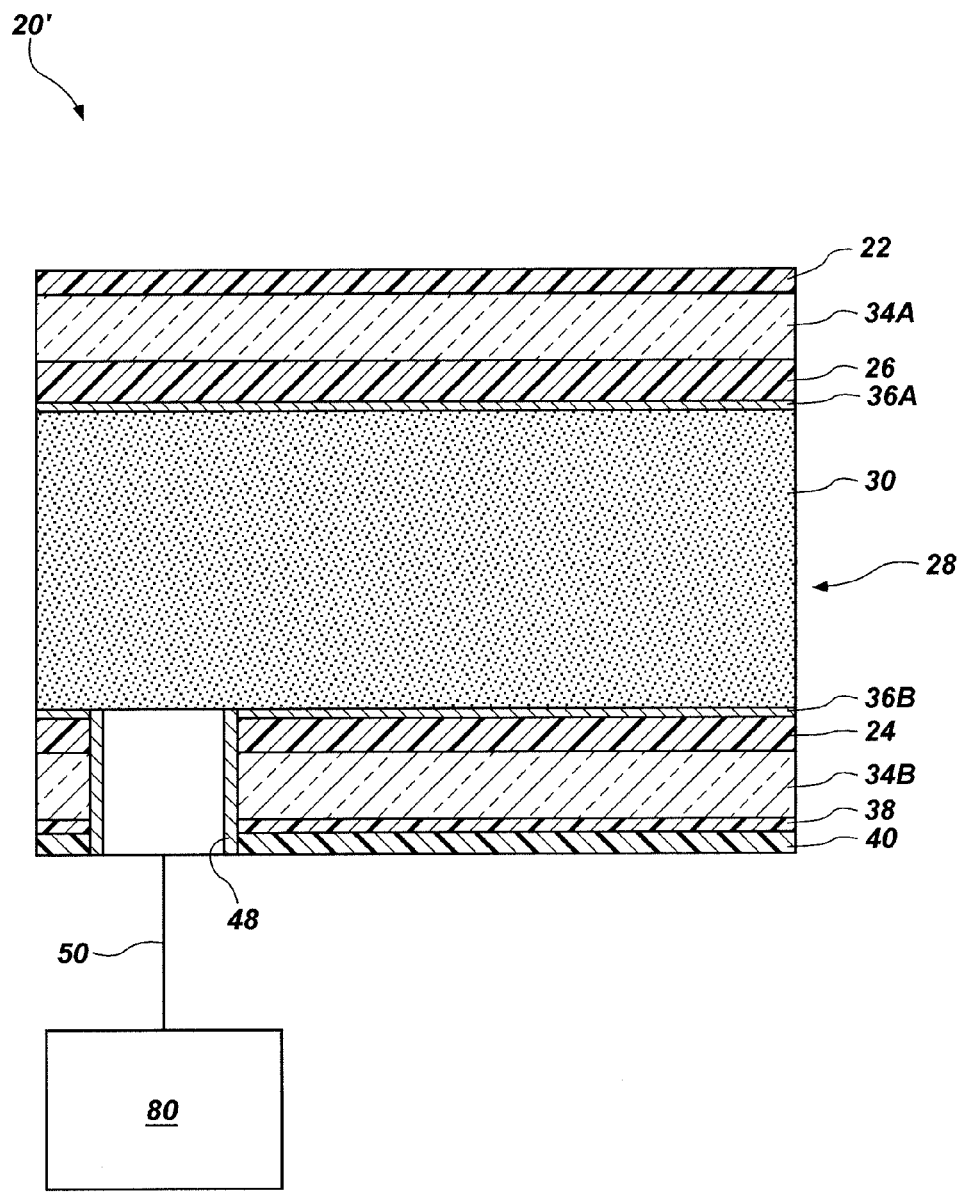
FIG. 6 is a cross-sectional view of another embodiment of a radiation shield of the present invention that may be used in a spacecraft like that shown in FIG. 1.

FIG. 6 is a cross-sectional view of another embodiment or a segment or portion of a radiation shield 20' of the spacecraft 10 shown in FIG. 1. The radiation shield 20' is similar to the radiation shield 20 previously described in relation to FIG. 2, but does not include the additional enclosed chamber 32. The radiation shield 20' does include, however, an outer composite wall 22, an inner composite wall 24 (which may serve as a primary structural pressure wall), and an enclosed fuel chamber 28 disposed between the outer composite wall 22 and the inner composite wall 24, as discussed in relation to the radiation shield 20 of FIG. 2. The radiation shield 20' may further include at least one fuel port 48 and at least one fuel conduit 50 to allow fuel to be supplied from the enclosed fuel chamber 28, through the fuel port 48 and the at least one fuel conduit 50 to the fuel cell 80. The radiation shield 20' also may include thermal insulating layers 34A, 34B, metal or plastic liners 36A, 36B for bonding a porous body 30 within the enclosed fuel chamber 28 to the interior composite wall 26 and the inner composite wall 24, one or more fiber reinforced composite fail safe layers 38, and a polymer radiation shield layer 40 as shown in FIG. 6. Such components may be as previously described in relation to the radiation shield 20 of FIG. 2.

In some embodiments, the enclosed fuel chamber 28 of one or more sections of the spacecraft 10 may contain oxygen, and/or water produced by reaction of oxygen and hydrogen fuel. In such embodiments, the average thickness of the enclosed fuel chamber 28 in such a section may be between about 5.0 centimeters and about 20.0 centimeters. For example, for a lunar base, the average thickness may be at least about 6.4 centimeters to provide desirable shielding from galactic cosmic radiation.

Referring to FIG. 6, in additional embodiments, the outer composite wall 22 could be removed or absent in one or more sections of the spacecraft 10, and an average thickness of the first insulating layer 34A could be increased to an average thickness between about 8.9 centimeters and about 11.4 centimeters to serve as a heat shield. Such a configuration may be desirable for use when the spacecraft 10 is traveling through a $CO_2$ atmosphere, such as that found on Mars. In such embodiments, an outer layer of open pore foam and/or a silicone-carbide coating could be provided around and over the outboard side of the first insulating layer 34A.

In some embodiments, the composite materials in one or more layers disclosed herein may comprise a thermoplastic resin (e.g., polyimide (PI), polyamideimide (PAI) or polyetherimide (PEI), or variants thereof), which may exhibit relatively higher glass transition temperatures), as opposed to thermoset resins, and may be formed with tow graphite and/or fabric fiber reinforcing materials in a low pressure closed mold mid-temperature process. In such embodiments, the thermoplastic resin may include chopped fiber and/or particle filler materials. Such sections or portions including thermoplastic resins may be formed separately from other sections or portions that include thermoset materials.

In some embodiments, the composite materials in one or more layers disclosed herein may include carbon fibers that are covered with carbon nanotubes. Such fibers are referred to in the art as "fuzzy fiber," and may exhibit desirable properties or characteristics at the interface between the fibers and the surrounding polymer matrix materials.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover this method of ordered multifunctional materials, with all modifications, equivalents, and alternatives falling within the scope of the invention as defined by the following appended claims and their legal equivalents. For example, elements and features disclosed in relation to one embodiment may be combined with elements and features disclosed in relation to other embodiments of the invention.

What is claimed is:

1. A radiation shield comprising:
   an outer composite wall comprising a first layer of composite material;
   an inner composite wall comprising a second layer of composite material;
   an enclosed fuel chamber disposed between the outer composite wall and the inner composite wall, the enclosed fuel chamber containing fuel;
   a polymer radiation shield layer disposed on a side of the inner composite wall opposite the enclosed fuel chamber;
   a fiber-reinforced composite fail safe layer disposed between the inner composite wall and the polymer radiation shield layer; and
   wherein the first layer of composite material and the second layer of composite material have compositions impeding transmission of primary and secondary radiation therethrough, and the fiber-reinforced composite fail safe layer is more resistant to transverse loading relative to the first layer of composite material and the second layer of composite material.

2. The radiation shield of claim 1, wherein the fuel comprises electrochemical fuel.

3. The radiation shield of claim 2, wherein the electrochemical fuel comprises liquid hydrogen.

4. The radiation shield of claim 1, further comprising at least one port located and configured to provide fluid communication between the enclosed fuel chamber and an exterior of the radiation shield through at least one of the outer composite wall and the inner composite wall.

5. The radiation shield of claim 1, wherein at least one of the outer composite wall and the inner composite wall comprises a fabric reinforcing phase disposed within a matrix phase.

6. The radiation shield of claim 1, further comprising a porous body within the enclosed fuel chamber, the porous body comprising a three-dimensional network of open pores.

7. The radiation shield of claim 6, wherein the fuel comprises liquefied hydrogen deuteride disposed within the open pores of the porous body.

8. The radiation shield of claim 1, further comprising at least one interior composite wall disposed between the outer composite wall and the inner composite wall.

9. The radiation shield of claim 8, further comprising an additional enclosed chamber disposed between the outer composite wall and the inner composite wall, the enclosed fuel chamber disposed on a first side of the at least one interior composite wall, and the additional enclosed chamber disposed on an opposite second side of the interior composite wall.

10. The radiation shield of claim 8, wherein the additional enclosed chamber comprises a vacuum chamber.

11. The radiation shield of claim 1, wherein the at least one fiber-reinforced composite fail safe layer is configured to resist micro-meteorite impacts.

12. The radiation shield of claim 1, further comprising at least one insulating layer disposed on or over a side of the enclosed fuel chamber.

13. The radiation shield of claim 1, further comprising a thermal control coating on a surface of the outer composite wall.

14. The radiation shield of claim 1, wherein the polymer radiation shield layer comprises borated polyethylene.

15. A spacecraft, comprising:
 a radiation shield forming at least one wall of the spacecraft, the radiation shield including:
  an outer composite wall comprising a first layer of composite material;
  an inner composite wall comprising a second layer of composite material;
  an enclosed fuel chamber disposed between the outer composite wall and the inner composite wall;
  at least one fuel port located and configured to provide fluid communication between the enclosed fuel chamber and the exterior of the radiation shield through at least one of the outer composite wall and the inner composite wall; and
  wherein the first composite layer and the second composite layer have compositions impeding transmission of primary and secondary radiation therethrough;
 a fuel cell; and
 at least one conduit providing fluid communication between the enclosed fuel chamber and the fuel cell.

16. The spacecraft of claim 15, further comprising an electrochemical fuel within the enclosed fuel chamber.

17. The spacecraft of claim 15, further comprising:
 an additional enclosed chamber disposed between the outer composite wall and the inner composite wall of the radiation shield;
 at least one additional port located and configured to provide fluid communication between the interior of the additional enclosed chamber and the exterior of the radiation shield through at least one of the outer composite wall and the inner composite wall;
 a device configured to collect solid particulate matter from the exterior of the radiation shield; and
 at least one conduit extending between the device configured to collect solid particulate matter and the at least one additional port for conveying solid particulate matter collected by the device therethrough into the additional enclosed chamber of the radiation shield.

18. The spacecraft of claim 17, wherein the additional enclosed chamber comprises one of air, oxygen, nitrogen, and an inert gas.

19. The spacecraft of claim 17, wherein the additional enclosed chamber comprises a vacuum chamber.

20. The spacecraft of claim 17, further comprising at least one interior composite wall disposed between the outer composite wall and the inner composite wall and separating the additional enclosed chamber and the enclosed fuel chamber.

21. A method of forming a radiation shield system, comprising:
 forming an enclosed fuel chamber between an outer composite wall and an inner composite wall of a radiation shield;
 forming a polymer radiation shield layer disposed on a side of the inner composite wall opposite the enclosed fuel chamber;
 forming a fiber-reinforced composite fail safe layer between the inner composite wall and the polymer radiation shield layer;
 selecting each of the outer composite wall and the inner composite wall to comprise materials impeding transmission of primary and secondary radiation therethrough, and selecting the fiber-reinforced composite fail safe layer to be more resistant to transverse loading relative to the outer composite wall and the inner composite wall; and
 providing fuel within the enclosed fuel chamber.

22. The method of claim 21, further comprising establishing fluid communication between the enclosed fuel chamber and a fuel cell configured to generate power using the fuel.

23. The method of claim 22, wherein establishing fluid communication between the enclosed fuel chamber and the fuel cell comprises connecting an end of at least one conduit to at least one port providing fluid communication between the enclosed fuel chamber and an exterior of the radiation shield.

24. The method of claim 21, further comprising forming an additional enclosed chamber between the outer composite wall and the inner composite wall of the radiation shield.

25. The method of claim 24, further comprising separating the additional enclosed chamber from the enclosed fuel chamber by at least one interior wall.

26. The method of claim 25, further comprising filling the additional enclosed chamber with at least one of air, oxygen, nitrogen, and a noble gas.

27. The method of claim 24, further comprising establishing fluid communication between the additional enclosed chamber and a pump device or a fan device.

* * * * *